United States Patent [19]

Stuntz

[11] 3,876,123
[45] Apr. 8, 1975

[54] BICYCLE CARRIER FOR AUTOMOBILE

[76] Inventor: Kenneth E. Stuntz, 820 Wente Ct., Palatine, Ill. 60067

[22] Filed: Aug. 20, 1973

[21] Appl. No.: 390,048

[52] U.S. Cl. ............................ 224/42.03 B; 211/182
[51] Int. Cl. ................................................ B60m 9/10
[58] Field of Search...224/42.03 B, 42.03 R, 42.03 A, 224/29 R, 25 A, 42.46 R, 42.42 R; 211/182, 177; 403/217, 13

[56] References Cited
UNITED STATES PATENTS

| 2,512,267 | 6/1950 | Donnelley | 224/42.03 B |
| 3,300,111 | 1/1967 | Hedgepeth | 224/42.07 |

FOREIGN PATENTS OR APPLICATIONS

| 87,465 | 9/1936 | Sweden | 224/42.03 R |
| 72,512 | 11/1944 | Norway | 224/32 A |

Primary Examiner—Robert J. Spar
Assistant Examiner—Jerold M. Forsberg
Attorney, Agent, or Firm—Darbo, Robertson & Vandenburgh

[57] ABSTRACT

An automobile mounted bicycle carrier comprises two interconnected members which are mirror images of each other. Each is tubular and comprises an upright and a diagonal connected by a curve at the top of each. Where the two diagonals cross they are connected by a bolt. The bottom end of the diagonals is flat and extends into a slot in the opposite upright. The bumper mounting for each upright comprises a vertical plate having top and bottom flanges. A metal strap is clamped to the top flange and hooks over the top of the bumper. A hook engaging the bottom of the bumper is connected to the bottom flange with a strap. One clamp grasps the upright and is pivotally connected to the plate. A second clamp grips the upright and is connected to the plate by a bolt which extends through an arcuate adjusting slot in the plate.

7 Claims, 12 Drawing Figures

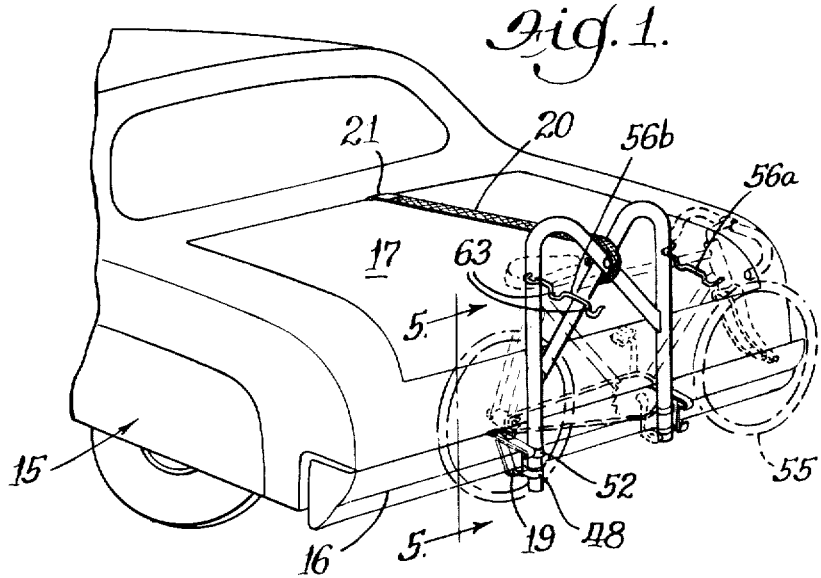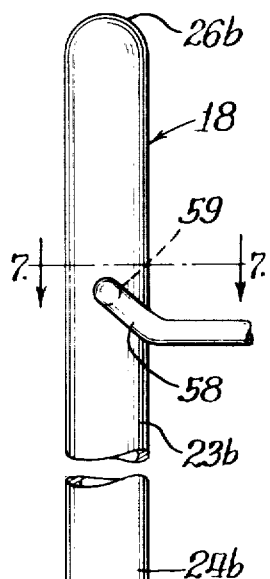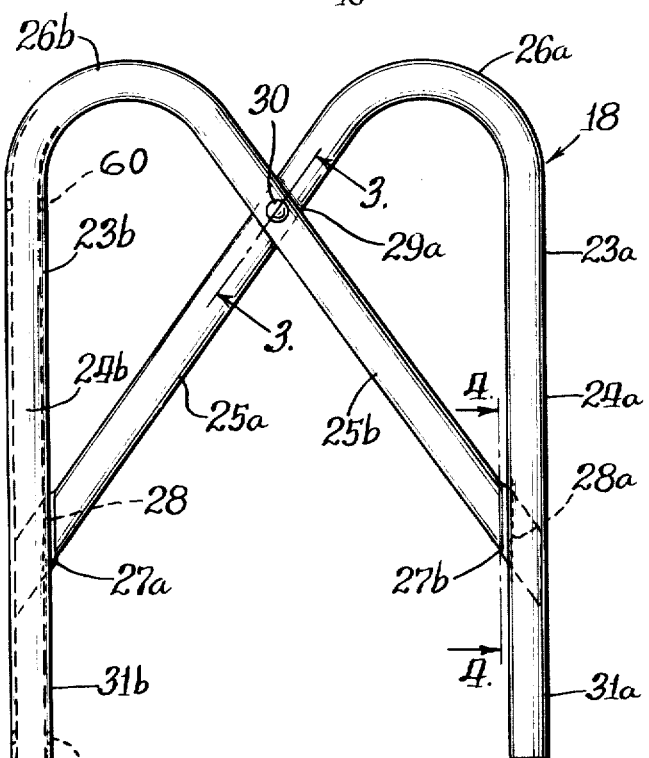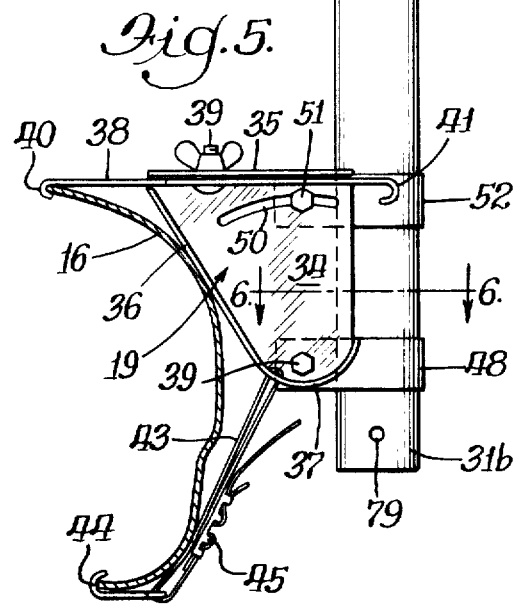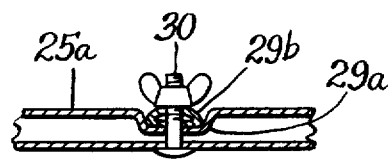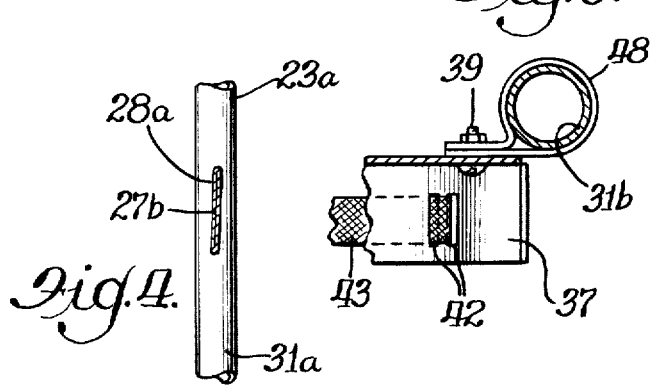

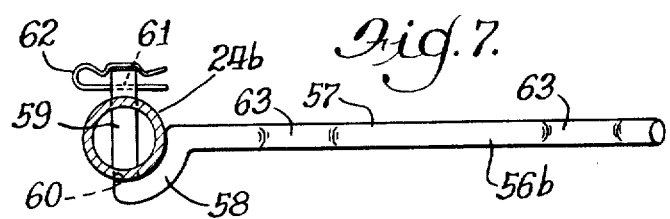
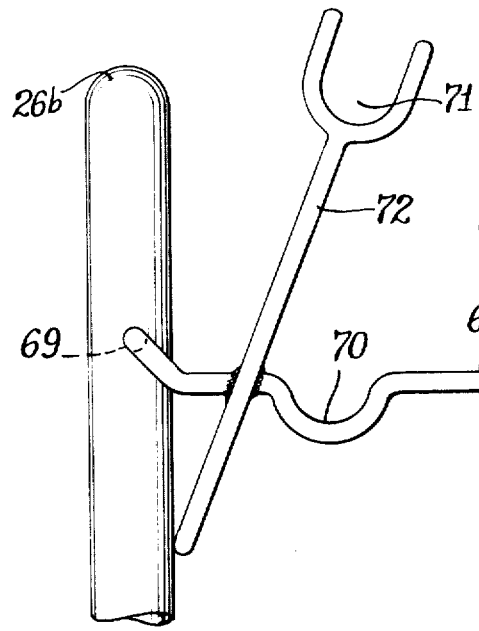
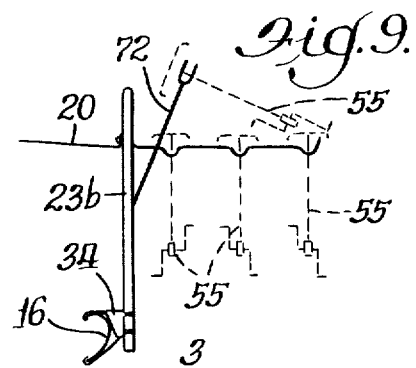
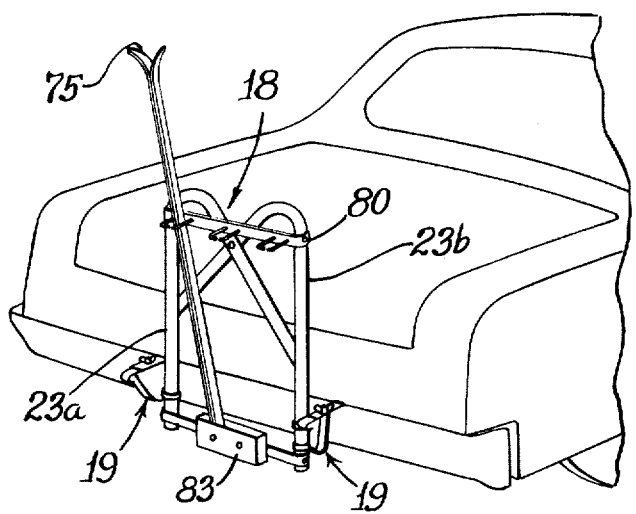
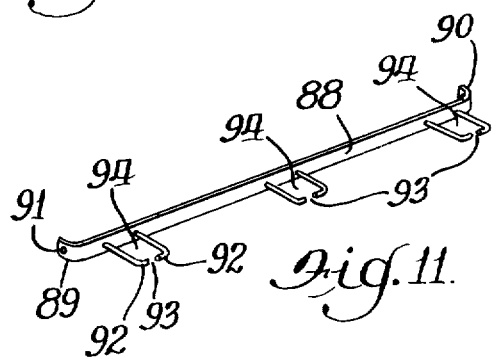
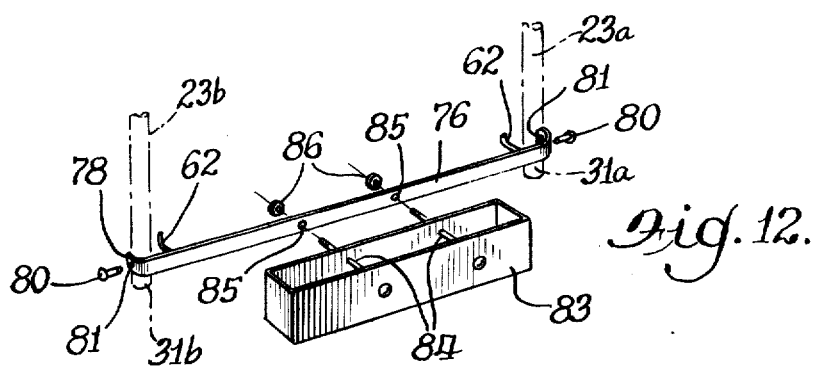

3,876,123

1

BICYCLE CARRIER FOR AUTOMOBILE

SUMMARY OF THE INVENTION

The present invention pertains to a support for transporting cycles, skis and the like on a motor vehicle, utilizing a supporting frame of such a configuration that it is easily and inexpensively manufactured. It provides good rigidity to support the cycle, etc., and has an attractive appearance. It is compact for storage and is easy to put in place on a vehicle. The invention also incorporates a bumper mount of universal applicability to various vehicles and conditions of transport.

DESCRIPTION OF THE DRAWINGS

FIG. 1 is a perspective view of the rear of a motor vehicle on which an embodiment of the invention is mounted;

FIG. 2 is an elevational view of the frame utilized in the mount of the present invention;

FIG. 3 is a section as viewed at line 3—3 of FIG. 2;

FIG. 4 is a section as viewed at line 4—4 of FIG. 2;

FIG. 5 is a section through the vehicle bumper and an elevational view of the embodiment of the invention as seen at line 5—5 of FIG. 1;

FIG. 6 is a partial section as seen at line 6—6 of FIG. 5;

FIG. 7 is a sectional view as seen at line 7—7 of FIG. 5;

FIG. 8 is an elevational view of an alternative form of cycle support;

FIG. 9 is a schematic illustration of the manner of use of the embodiment of FIG. 8;

FIG. 10 is a perspective view illustrating the use of the invention in transporting skis;

FIG. 11 illustrates a top ski support as used in the embodiment of FIG. 10; and

FIG. 12 illustrates the bottom ski support as employed in the embodiment of FIG. 10.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The present invention is adaptable for use with a wide variety of motor vehicles. One such situation is illustrated in FIG. 1 where there is an automobile, generally 15, having a rear bumper 16 and a rear trunk lid 17. The illustrated embodiment comprises a frame, generally 18, a pair of mounting devices, generally 19, for securing the frame to the bumper 16, a strap 20 having a hook 21 for grasping the edge of the trunk lid and holding the top of the frame from rearward displacement, and a device (e.g., 56a, 56b, 66b, etc.) for supporting the cycle, skis, etc., from the frame.

The frame 18 is made of two members 23a and 23b. These members are mirror images of each other; in fact, they are manufactured identical to each other. Each member consists of an upright 24a, 24b and a diagonal 25a and 25b. The members are tubular. The upper end of the upright 24a, 24b is joined to the proximal end of the diagonal 25a, 25b by a smooth curve 26a, 26b. The distal end 27a, 27b of the diagonal is flat.

It is received in a slot 28a, 28b in the wall of the upright and extends downwardly within the interior of the tube beyond the slot. This slot is angled with respect to the axis of the upright. In the area in which the diagonals cross they each have a flat 29a, 29b. A bolt 30 with a wing nut thereon extends through the two members at this area of intersection. The uprights have lower ends 31a, 31b which extend below the point at which the diagonals connect to the opposite uprights (e.g., below slots 28a, 28b).

When two members are so formed, one is reversed with respect to the other and the distal ends of the two diagonals are inserted into the slots on the upright of the opposite member. The bolt 30 is then put into place to hold the members together. This bolt plus the angle at which the distal ends protrude within the interior of the opposite member serve to restrain the members against separation in a horizontal direction. The construction also provides a form of sway-brace effect. By disassembling the members, using the reverse of the foregoing described procedure, the frame can be rendered more compact for storing.

The mounting device 19 for each member of the frame comprises a body in the form of a vertical plate 34 having an integral top flange 35, a front flange 36, and a bottom flange 37 which is an extension of the front flange. A metal strap 38 underlies the top flange 35 and is releasably affixed thereto by a bolt 39 having a wing nut thereon. Strap 38 has a relatively small hook 40 at one end thereof and a relatively large hook 41 at the other end. These hooks are usable alternatively depending upon the configuration of the bumper to which the hitch is being secured. Metal strap 38 has a plurality of openings spaced longitudinally thereof for receiving bolt 39 in different positions. Also, flange 35 has a similar set of openings along a line parallel to the length of the strap 38. These various openings provide for adjustment of the position of the strap with respect to the body 34–36 to fit various bumper configurations. The bottom flange 37 has a pair of parallel openings 42 to receive a fabric strap 43. Strap 43 is connected to a bottom bumper hook 44 and has a buckle 45 by means of which adjustment of the length of the strap may be made.

A bottom clamp 48 grips the lower end 31b of the member 23b. It is drawn tight about the member by a bolt 39 which extends through a suitable opening in plate 34. This bolt connection with plate 34 also serves as a pivot point. Plate 34 has a slot 50 in an arc at a radius about bolt 39. Through this slot is a bolt 51 which is a part of the upper clamp 52. The hitch 19 on member 23a corresponds to that just described.

The device for supporting the item of equipment from the frame 18 will depend upon just what items are to be supported. FIGS. 1, 5 and 7 illustrate a device for supporting two bicycles 55. This comprises two supports 56a and 56b, which are identical except that one is a "left" and the other is a "right." Support 56b includes an outwardly extending arm 57, an arcuate portion 58 which is in juxtaposition to a front quarter of the upright 24b and a pin portion 59 which extends through an opening 60 in the upright. The arcuate portion 58 rests against the upright 24b when the arm 57 is substantially at right angles to the upright. The pin portion 59 has an opening 61 to receive a clip 62 to thereby prevent the pin 59 from unintentionally separating from the upright 24b. The arm 57 has two depressions 63 to form sockets for the holding of bicycles. The configuration of support 26a corresponds to that just described, except for the fact that the arcuate portion and the pin portion (corresponding to 58 and 59, respectively) are reversed in their relationship to the arm. In some embodiments this reversal is not necessary and the identical support could be employed with member 23a as if used with member 23b.

FIGS. 8 and 9 illustrate an alternative embodiment for holding four cycles 55. Here the support 66b includes an arm 67, an arcuate portion and a pin portion 69. The arm 67 is longer than arm 57 and includes three depressions 70 for holding cycles, rather than two as was the case with support 56b. In addition, the support includes a fourth socket 71 for holding a cycle. This socket is on the upper end of a rod 72. Rod 72 is welded to arm 67 and the lower end of the rod bears against upright 23b. As illustrated in FIG. 9, three cycles are suspended from the arm 67, being located in the respective depressions (forming sockets) 70. A fourth cycle is then positioned thereabove by having upper portions of the cycles received in socket 71 and the lower part of the cycle resting on the cycle at the distal ends of the arm 67.

FIGS. 10-12 illustrate the use of the frame 18 for carrying skis 75. A lower support bar 76 has curved ends 78 which fit about the lower ends 31a and 31b of the members 23a and 23b. At the bottom ends of the members there are openings 79. A pin 80 is slipped through the openings 81 in the ends of bar 76 and openings 79 to hold the bar in place. Clips 62 are inserted through openings in pins 80 to hold the pins in place.

A support box 83 (being open only on the top) is mounted to the lower support bar 76 by means of bolts 84 which extend through openings 85 in the support bar. Nuts 86 are then screwed onto the bolts to hold the support box 83 in place. The bottom ends of the skis are held in this box.

An upper support bar 88 has curved ends 89 and 90 with openings 91 therein. This upper support bar has three pairs of spaced holders 92. The distal ends of the holders 92 define a gap 93 sufficiently wide to permit a ski to pass therethrough and be received in the pocket 94 between the spaced holders 92. The curved ends 89 and 90 fit about the upper part of the uprights 24a and 24b. Openings 90 are aligned with openings 60. Pins 80 are then inserted through the aligned openings and affixed in place by clips similar to 62.

Under normal conditions a purchaser would acquire a frame 18 and two mounting devices 19 in a disassembled condition, or at least only partially assembled. They would be packed in a cardboard box which could serve as a storage container. This container could be comparatively small when at least the frame 18 was disassembled. The container would also include one or more pairs of supports, e.g., 56a, 56b, 66b, etc., suitable for the use to which the purchaser desired to make of his carrier. The purchaser would then assemble the frame 18 by inserting the distal ends 27a and 27b in the slots 28 and 28a of the opposite member. Bolt 30 would then be put into place.

The clamps 48 and 52 of the mounting devices would be applied to the lower ends of the uprights. At least bolt 39 would be made sufficiently snug so that the components would not separate. The upper metal straps 38 would be hooked over the top of the bumper and adjusted in length so that they were approximately horizontal with the front flange 36 resting against the back of the bumper (this would usually be in the vicinity of the top of the bumper). The lower hooks 44 would be applied to the bottom of the bumper and the strap 43 drawn snug to hold the mounting device 19 securely against the bumper.

The final adjustment of the position of the frame 18 with respect to the vehicle would then be made. This is done by loosening bolts 39 and 51. This permits the frame 18 to be raised or lowered with respect to the vehicle. It also permits the frame to be positioned vertically or canted as desired. When the adjustments have been completed bolts 39 and 51 are tightened to hold the frame in that position. The strap 21 could be put in place at this stage. Alternatively, it can be put in place after one or two cycles are loaded on the carrier, with the strap being brought about the cycles to aid in holding them in depressions 63, for example. Other supplemental means, e.g., rope, straps, etc., can be employed as desired to hold the items being transported upon the appropriate supports.

I claim:

1. In an apparatus to be temporarily affixed to an end of a motor vehicle for transporting items such as cycles, skis and the like wherein the apparatus includes a frame, means for releasably affixing the frame to an end of the vehicle and means for supporting the item on said frame, the improvement wherein said frame comprises:

two interconnected members which are mirror images of each other, each member comprising
an upright having a top and a bottom and a diagonal having a distal end and a proximal end, said upright and diagonal being unitary with the top and the proximal end being a continuation of each other,
the distal end of each member being connected to the upright of the other member adjacent the bottom end of the other member, said diagonals passing each other between the uprights and being connected at the point of passing.

2. In an apparatus as set forth in claim 1, wherein said members are formed of tubing, each member in the area of said top and said proximal end being a smooth curve from the upright to the diagonal, the tubing having flats thereon at the point of passing and at the distal end.

3. In an apparatus as set forth in claim 2, wherein said connection at said passing point includes a releasable connecting device holding the flat of one member against the flat of the other member, the connection of the diagonal of one member with the upright of the other member being formed by the upright of the other member having a slot therein on the side toward the one member, the flat of the one member extending into said slot.

4. In an apparatus as set forth in claim 3, wherein the upright of said other member has an axis, said slot being angularly disposed with respect to said axis.

5. In an apparatus as set forth in claim 4, wherein the vehicle has a bumper to which the apparatus is releasably affixed, the improvement wherein said releasable affixing means comprises:

a mounting device for each member respectively, each device including a body adapted to bear against the outside of said bumper, a first hook extending from the body, over the top of the bumper and engaging the top edge of the bumper, a second hook extending under the bottom of the bumper and engaging the bottom edge of the bumper, an adjustable strap connecting the body and the second hook, and means connecting the body to the bottom end of the member, the last mentioned means being adjustable for changing the vertical angle between the body and the member.

6. In an apparatus as set forth in claim 5, wherein said body comprises an upright plate having a top flange and a bottom flange extending normal to the plate, said first hook having a metal strap in juxtaposition to the top flange, means to releasably clamp said metal strap to said top flange in a variety of positions, said bottom flange having a pair of adjacent slots therein, said adjustable strap extending through said slots, the last mentioned means including a first clamp to grip the member and pivotally connected to the plate at a pivot point, said plate having an arcuate slot therein with said pivot point as the center about which the slot forms an arc, a second clamp gripping said member, a bolt extending through said slot and engaging said second clamp.

7. In an apparatus to be temporarily affixed to an end of a motor vehicle having a bumper for transporting items such as cycles, skis and the like wherein the apparatus includes a frame, means for releasably affixing the frame to an end of the vehicle and means supporting the item on said frame, the improvement comprising:

said frame including two upright members each having a lower end; and said releasably affixing means comprising a mounting device for each member respectively, each device including a body adapted to bear against the outside of said bumper, a first hook extending from the body, over the top of the bumper and engaging the top edge of the bumper, a second hook extending under the bottom of the bumper and engaging the bottom edge of the bumper, an adjustable strap connecting the body and the second hook, means connecting the body to the bottom end of the member, the last mentioned means being adjustable for changing the vertical angle between the body and the member, said body comprising an upright plate having a top flange and a bottom flange extending normal to the plate, said first hook having a metal strap in juxtaposition to the top flange, means to releasably clamp said metal strap to said top flange in a variety of positions, said bottom flange having a pair of adjacent slots therein, said adjustable strap extending through said slots, the last mentioned means including a first clamp to grip the member and pivotally connected to the plate at a pivot point, said plate having an arcuate slot therein with said pivot point as the center about which the slot forms an arc, a second clamp gripping said member, and a bolt extending through said slot and engaging said second clamp.

* * * * *